(12) United States Patent
Huang et al.

(10) Patent No.: US 12,462,554 B2
(45) Date of Patent: Nov. 4, 2025

(54) FINGERPRINT RECOGNITION DEVICE AND FINGERPRINT RECOGNITION METHOD

(71) Applicant: REALTEK SEMICONDUCTOR CORPORATION, Hsinchu (TW)

(72) Inventors: Yi-Hsuan Huang, Hsinchu (TW); Chih-Yuan Cheng, Hsinchu (TW); Yu-Chi Tsai, Hsinchu (TW); Yi-Jen Wu, Hsinchu (TW); Wen-Tsung Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 19/036,329

(22) Filed: Jan. 24, 2025

(65) Prior Publication Data

US 2025/0252732 A1    Aug. 7, 2025

(30) Foreign Application Priority Data

Feb. 1, 2024  (TW) .................................. 113104055

(51) Int. Cl.
*G06V 40/12* (2022.01)
*G06V 10/98* (2022.01)

(52) U.S. Cl.
CPC ........ *G06V 10/993* (2022.01); *G06V 40/1347* (2022.01); *G06V 40/1365* (2022.01)

(58) Field of Classification Search
CPC ............. G06V 10/993; G06V 40/1347; G06V 40/1365
See application file for complete search history.

(56) References Cited

U.S. PATENT DOCUMENTS

| | | | |
|---|---|---|---|
| 7,072,523 B2 | 7/2006 | Bolle | |
| 11,232,549 B2* | 1/2022 | Narasimha-Iyer | ... G06V 10/993 |
| 2004/0042645 A1 | 3/2004 | Wang | |
| 2019/0122023 A1* | 4/2019 | Chen | ...... G06V 40/13 |
| 2021/0150178 A1* | 5/2021 | Wang | ................. G06V 40/1388 |
| 2021/0209333 A1* | 7/2021 | Sakumoto | ........... G06F 3/04182 |
| 2023/0316802 A1* | 10/2023 | Zhai | .................... G06V 40/1365 |
| | | | 382/124 |

FOREIGN PATENT DOCUMENTS

| CN | 111428701 B | 9/2020 |
|---|---|---|
| CN | 113010867 A | 6/2021 |

OTHER PUBLICATIONS

OA letter of a counterpart TW application (appl. no. 113104055) mailed on Aug. 5, 2024.

* cited by examiner

*Primary Examiner* — Jonathan A Boyd
(74) *Attorney, Agent, or Firm* — WPAT, PC (57) ABSTRACT

A fingerprint recognition device includes a memory and a processor. The memory is configured to store at least one command. The processor is configured to read the at least one command to execute following steps: dividing a fingerprint image into a plurality of sub-areas; classifying the plurality of sub-areas into a plurality of high-quality areas and a plurality of low-quality areas according to a grayscale value ratio of the plurality of sub-areas; obtaining a first feature sample of the plurality of high-quality areas; obtaining a second feature sample of the plurality of low-quality areas, wherein a number of the first feature sample is larger than a number of the second feature sample; and outputting the first feature sample and the second feature sample.

16 Claims, 5 Drawing Sheets

FINGERPRINT RECOGNITION DEVICE AND FINGERPRINT RECOGNITION METHOD

BACKGROUND OF THE INVENTION

1. Field of the Invention

The present disclosure relates to a fingerprint recognition device and a fingerprint recognition method, especially to a fingerprint recognition device and a fingerprint recognition method that classifies the same fingerprint image into different quality areas for sampling adaptively.

2. Description of Related Art

With the advancement of technology, fingerprint recognition has become one of the most commonly used unlocking methods for electronic devices. The fingerprint recognition can be classified into different unlocking modes according to states of different fingerprints, such as classifying into a dry fingerprint unlocking mode and a wet fingerprint unlocking mode.

However, in cases where both dry and wet states may exist simultaneously within the same fingerprint, if a single fingerprint unlocking mode (e.g., only using dry fingerprint unlocking mode or wet fingerprint unlocking mode) is solely utilized for unlocking, the recognition rate of the fingerprint recognition will be affected, even fingerprint recognition failures will occur.

SUMMARY OF THE INVENTION

In some aspects, an object of the present disclosure is to, but not limited to, provides a fingerprint recognition device and a fingerprint recognition method that makes an improvement to the prior art.

An embodiment of a fingerprint recognition device of the present disclosure includes a memory and a processor. The memory is configured to store at least one command. The processor is configured to read the at least one command to execute following steps: dividing a fingerprint image into a plurality of sub-areas; classifying the plurality of sub-areas into a plurality of high-quality areas and a plurality of low-quality areas according to a grayscale value ratio of the plurality of sub-areas; obtaining a first feature sample of the plurality of high-quality areas; obtaining a second feature sample of the plurality of low-quality areas, wherein a number of the first feature sample is larger than a number of the second feature sample; and outputting the first feature sample and the second feature sample.

An embodiment of a fingerprint recognition method of the present disclosure which is executed by a processor reading at least one command includes following steps: dividing a fingerprint image into a plurality of sub-areas; classifying the plurality of sub-areas into a plurality of high-quality areas and a plurality of low-quality areas according to a grayscale value ratio of the plurality of sub-areas; obtaining a plurality of first feature samples of the plurality of high-quality areas; obtaining a plurality of second feature samples of the plurality of low-quality areas, wherein a number of the plurality of first feature samples is larger than a number of the plurality of second feature samples; and outputting the plurality of first feature samples and the plurality of second feature samples.

Technical features of some embodiments of the present disclosure make an improvement to the prior art. The fingerprint recognition device and the fingerprint recognition method of the present disclosure can classify the same fingerprint image into different quality areas and adaptively sample different quality areas for facilitating subsequent fingerprint recognition. Therefore, the present disclosure effectively improves the problem that the recognition rate of the fingerprint recognition will be affected, and even fingerprint recognition failures will occur caused by solely utilizing a single fingerprint recognition mode.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

There are still problems need to be improved in the prior art, for example, if a single fingerprint unlocking mode is solely utilized for unlocking, the recognition rate of the fingerprint recognition will be affected, even fingerprint recognition failures will occur. The present disclosure provides a fingerprint recognition device and a fingerprint recognition method, which will be explained in detail as below.

Figure 1:
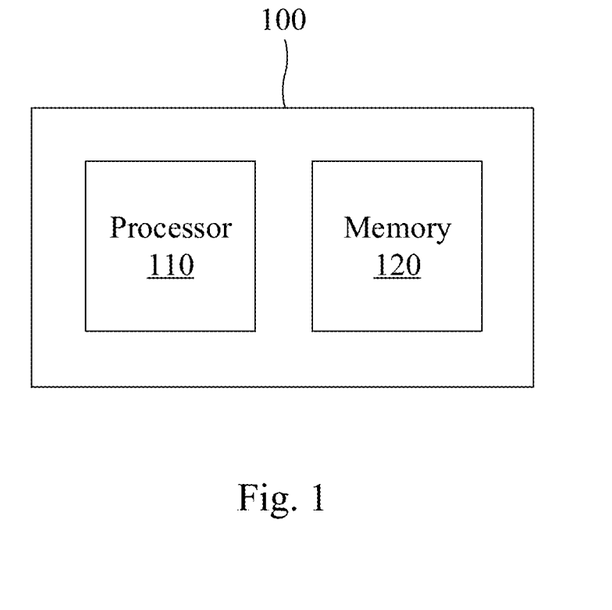
FIG. 1 shows an embodiment of a fingerprint recognition device of the present disclosure.
Figure 2:
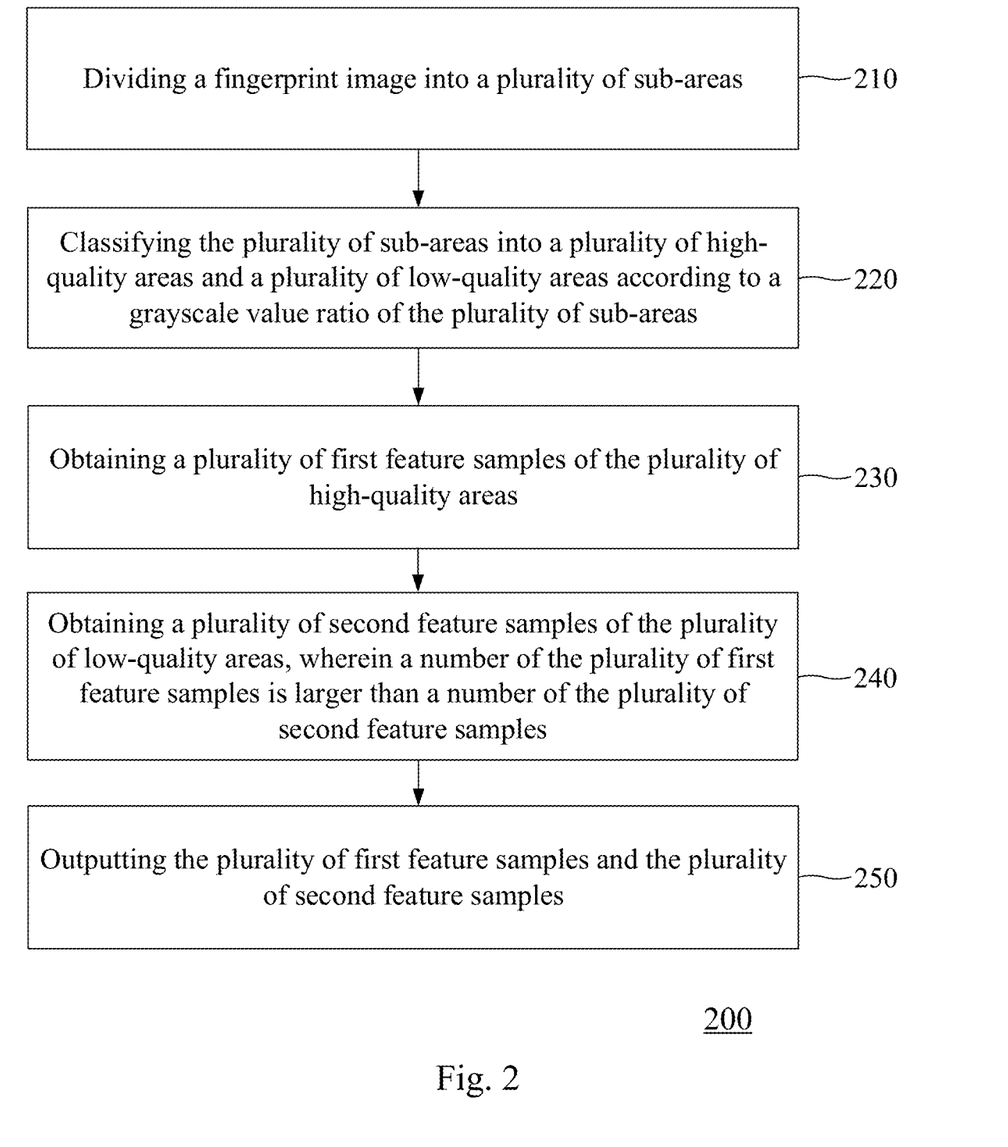
FIG. 2 shows an embodiment of a flow diagram of a fingerprint recognition method of the present disclosure.

FIG. 1 shows an embodiment of a fingerprint recognition device 100 of the present disclosure. As shown in the figure, the fingerprint recognition device 100 includes a processor 110 and a memory 120. The memory 120 is configured to store at least one command. The processor 110 is configured to read the at least one command to execute a fingerprint recognition. For facilitating the understanding of operations of the fingerprint recognition device 100, reference is now made to FIG. 2. FIG. 2 shows an embodiment of a flow diagram of a fingerprint recognition method 200 of the present disclosure.

First of all, in some embodiments, fingerprint images can be captured by sensors such as capacitive sensors, optical sensors, ultrasonic sensors, and so on. The captured fingerprint images are typically grayscale (two dimensional, 2D) images, which can represent the ridges and valleys of the fingerprints faithfully. Additionally, before executing the fingerprint recognition method 200, the present disclosure may execute preprocessing on the fingerprint images. The preprocessing may include noise reduction, smoothing, edge enhancement, and other treatments on the fingerprint images. The preprocessing can be executed by mean filters, sharpening filters, and so on. Normalization techniques such as Histogram Equalization can also be employed for processing.

Figure 3:
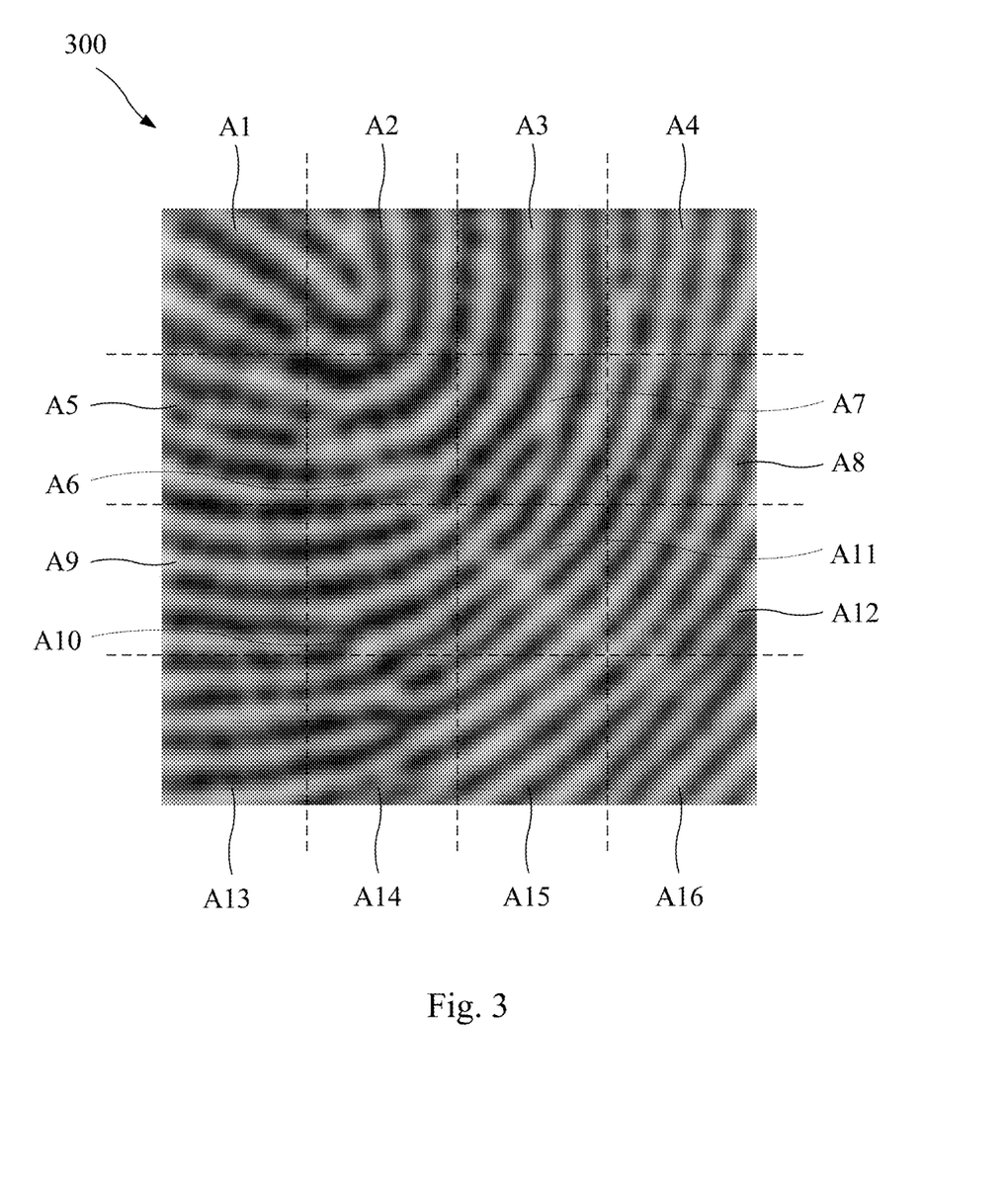
FIG. 3 shows an embodiment of a fingerprint image of the present disclosure.

Referring to FIG. 1 and FIG. 2, in step 210, dividing a fingerprint image into a plurality of sub-areas. For example, reference is made to FIG. 3, FIG. 3 shows an embodiment of a fingerprint image 300 of the present disclosure. The present disclosure may divide the fingerprint image 300 into a plurality of sub-areas A1~A16.

In step 220, classifying the plurality of sub-areas into a plurality of high-quality areas and a plurality of low-quality areas according to a grayscale value ratio of the plurality of sub-areas.

First of all, the way of receiving the grayscale values will be explained, and how to calculate the grayscale value ratio according to the grayscale values will be explained later. Reference is made to FIG. 3, the fingerprint recognition device 100 can receive a plurality of grayscale values of a plurality of pixels of each of the sub-areas A1 to A16. For example, it can receive the plurality of grayscale values of the plurality of pixels of the sub-area A1, the plurality of grayscale values of the plurality of pixels of the sub-area A2, . . . , and the plurality of grayscale values of the plurality of pixels of the sub-area A16.

Subsequently, for each of the plurality of sub-areas, the fingerprint recognition device 100 determines whether each of the plurality of grayscale values is larger than a grayscale threshold. For example, it determines whether the grayscale value of each of the pixels of the sub-area A1 is larger than the grayscale threshold. If one of the plurality of grayscale values (e.g., the grayscale value of one pixel of the sub-area A1) is larger than the grayscale threshold, the above-mentioned one of the grayscale values (e.g., the grayscale value of the above-mentioned pixel of the sub-area A1) is determined to be a high grayscale value. On the contrary, if one of the plurality of grayscale values (e.g., the grayscale value of one pixel of the sub-area A1) is not larger than the grayscale threshold, the above-mentioned one of the grayscale values (e.g., the grayscale value of the above-mentioned pixel of the sub-area A1) is determined to be a low grayscale value.

In some embodiments, for one of the plurality of sub-areas, the grayscale value ratio at step 220 is the ratio of the number of the high grayscale values of the above-mentioned sub-area to the number of the low grayscale values of the above-mentioned sub-area. In some embodiments, the grayscale threshold ranges from 107 grayscales to 147 grayscales. In some embodiments, the grayscale threshold can be 127 grayscales. In some embodiments, the grayscale threshold ranges from 100 grayscales to 140 grayscales. In some embodiments, the grayscale threshold ranges from 110 grayscales to 150 grayscales.

Figure 4:
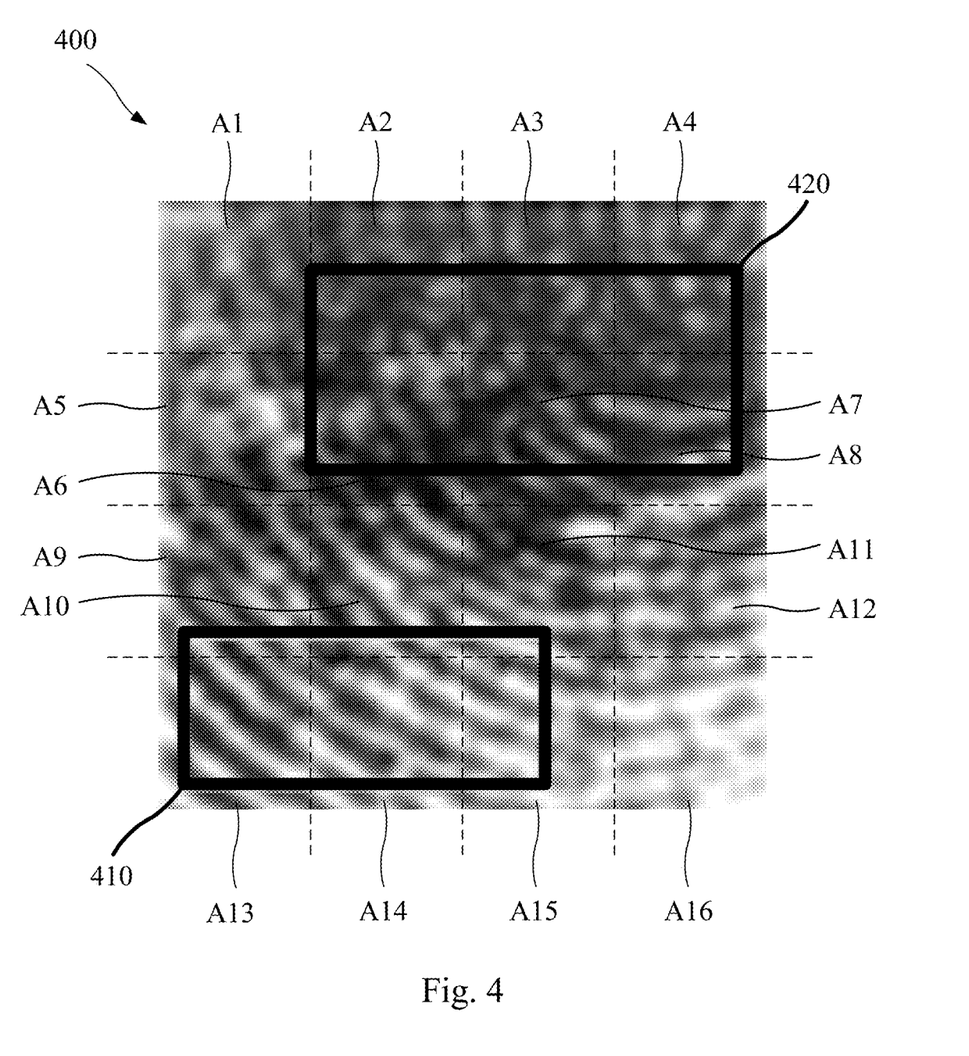
FIG. 4 shows an embodiment of a fingerprint image of the present disclosure.

Furthermore, the application of the grayscale value ratio will be explained as shown below. Reference is made to FIG. 4, which shows an embodiment of a fingerprint image 400 of the present disclosure. As shown in the figure, the fingerprint in the block 410 of the fingerprint image 400 is relatively intact, while the fingerprint in the block 420 of the fingerprint image 400 is blurry. In view of the above, even within the same fingerprint image 400, the fingerprint in different blocks has different conditions. Therefore, the fingerprint recognition device 100 of the present disclosure can classify the same fingerprint image 400 into different quality areas and adaptively sample different quality areas for facilitating subsequent fingerprint recognition, which will be explained in detail as shown below.

Reference is made to FIG. 4, the fingerprint recognition device 100 of the present disclosure can determine whether a grayscale value ratio of the high grayscale value to the low grayscale value of one of the plurality of sub-areas (e.g., one of the sub-areas A1~A16) is within a grayscale value ratio range. If the grayscale value ratio of the one of the plurality of sub-areas (e.g., one of the sub-areas A1~A16) is within the grayscale value ratio range, it is determined that the one of the plurality of sub-areas (e.g., one of the sub-areas A1~A16) is a high-quality area.

For example, the fingerprint in the block 410 of the fingerprint image 400 is relatively intact. It can be seen in the figure, the number of the high grayscale value and the number of the low grayscale value of the plurality of pixels in the sub-areas A13, A14, A15 correspond to the block 410 are close to 1:1. That is to say, the grayscale value ratio is near 1. The fingerprint recognition device 100 can determine that the grayscale value ratio (e.g., 1) of the high grayscale value to the low grayscale value in the sub-areas A13, A14, A15 is within the grayscale value ratio range (e.g., 0.6~1.4). At this time, it is determined that the sub-areas A13, A14, A15 are high-quality areas. In another embodiment, the sub-areas corresponding to the block 410 can further include sub-areas A9~A11, but the present disclosure is not limited to this embodiment.

Besides, if the grayscale value ratio of one of the plurality of sub-areas (e.g., one of the sub-areas A1~A16) is not within the grayscale value ratio range, it is determined that the one of the plurality of sub-areas (e.g., the one of the sub-areas A1~A16) is a low-quality area.

For example, the fingerprint in the block 420 of the fingerprint image 400 is blurry. Therefore, the grayscale value ratio (e.g., 2) of the sub-areas A2~A4 and A6~A8 corresponding to the block 420 is not within the grayscale value ratio range (e.g., 0.6~1.4). At this time, it is determined that the sub-areas A2~A4 and A6~A8 are low-quality areas.

In some embodiments, the grayscale value ratio range is 0.6 to 1.4. For example, the formula of the grayscale value ratio range of the present disclosure is as follows:

$$(1-\text{Bias\_TH}) \sim (1+\text{Bias\_TH}) \quad \text{formula 1}$$

As shown in formula 1, Bias_TH is the bias threshold. The bias threshold of the present disclosure can be 0.4. If the bias threshold of 0.4 is substituted into formula 1, the grayscale value ratio range is 0.6~1.4.

In some embodiments, the bias threshold of the present disclosure can be 0.3. If the bias threshold of 0.3 is substituted into formula 1, the grayscale value ratio range is 0.7~1.3. In some embodiments, the bias threshold of the present disclosure can be 0.5. If the bias threshold of 0.5 is substituted into formula 1, the grayscale value ratio range is 0.5~1.5.

In some embodiments, apart from using the grayscale value ratio to determine the quality area, other parameter (e.g., the standard deviation of grayscale within the area, the grayscale contrast within the area) can also be utilized for determination depending on actual requirements.

In step 230, obtaining a plurality of first feature samples of the plurality of high-quality areas. In step 240, obtaining a plurality of second feature samples of the plurality of low-quality areas, wherein the number of the plurality of first feature samples is larger than the number of the plurality of second feature samples.

Figure 5:
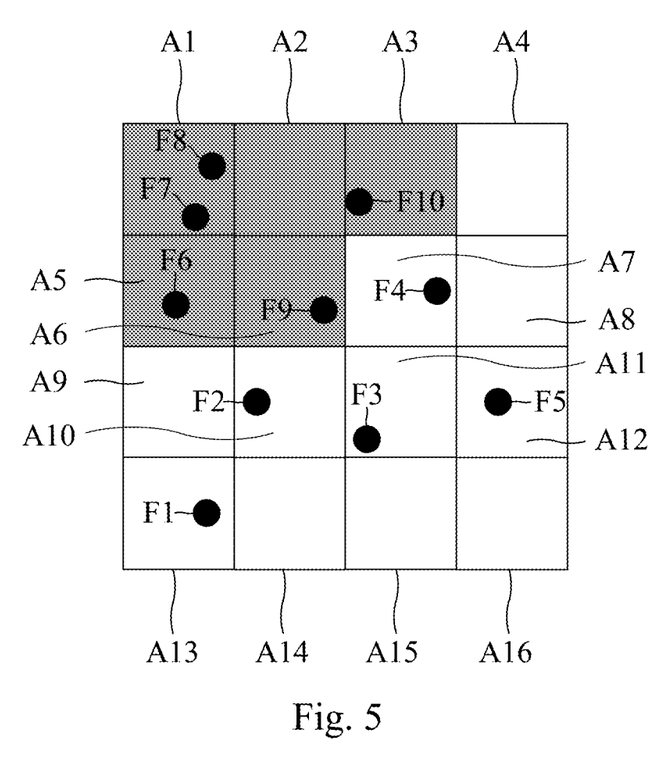
FIG. 5 shows an embodiment of a feature sampling of the present disclosure.
Figure 6:
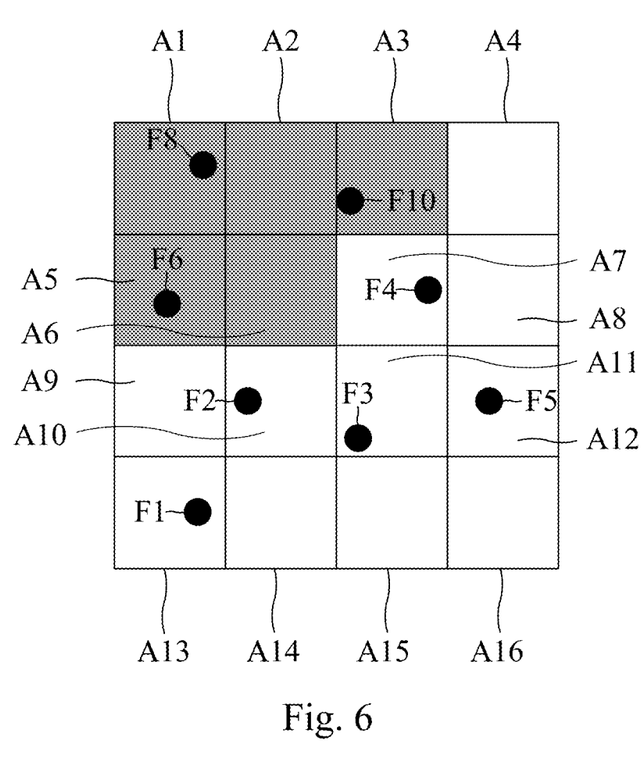
FIG. 6 shows an embodiment of a feature sampling of the present disclosure.

To explain the way of feature sampling, reference is made to FIG. 5 and FIG. 6. FIG. 5 shows an embodiment of a feature sampling of the present disclosure. As shown in the figure, white sub-areas A4 and A7~A16 are high-quality areas, and gray sub-areas A1~A3 and A5~A6 are low-quality areas. As shown in FIG. 5, there are five feature samples F1~F5 sampled from the high-quality areas A4 and A7~A16, and there are five feature samples F6~F10 sampled from the low-quality areas A1~A3 and A5~A6. In other words, the feature samples are equally sampled from the high-quality areas and the low-quality areas.

In contrast, as shown in FIG. 6, the fingerprint recognition device 100 of the present disclosure can adaptively sample the high-quality areas A4 and A7~A16 and the low-quality areas A1~A3 and A5~A6. For example, there are five feature samples F1~F5 sampled from the high-quality areas A4 and A7~A16, and there are three feature samples F6, F8, F10 sampled from the low-quality areas A1~A3 and A5~A6. In view of the above, the number (e.g., 5) of the feature samples sampled from the high-quality areas A4 and A7~A16 is larger than the number (e.g., 3) of the feature samples sampled from the low-quality areas A1~A3 and A5~A6.

The adaptive sampling to different quality areas by the fingerprint recognition device 100 of the present disclosure is based on the characteristics of fingerprints with different qualities. For example, the fingerprint images of the high-quality areas A4 and A7~A16 are clear. Therefore, the feature points obtained from the high-quality areas A4 and A7~A16 are more likely to belong to valid feature points rather than noise. Besides, the fingerprint images of the low-quality areas A1~A3 and A5~A6 are blurry, indicating that it is hard to distinguish fingerprint from noise in the feature sample, thus increasing the probability of errors. Therefore, the fingerprint recognition device 100 of the present disclosure concentrates the sampling of feature points in the high-quality areas A4 and A7~A16 while reducing sampling in the low-quality areas A1~A3 and A5~A6 for enhancing the recognition rate of the fingerprint recognition device 100.

In some embodiments, the plurality of first feature samples include a plurality of first feature points, and the plurality of second feature samples include a plurality of second feature points, wherein the number of the plurality of first feature points is larger than the number of the plurality of second feature points. For example, reference is made to FIG. 6, the number (e.g., 5) of the plurality of feature points sampled from the high-quality areas A4 and A7~A16 is larger than the number (e.g., 3) of the plurality of feature points sampled from the low-quality areas A1~A3 and A5~A6.

In some embodiments, the present disclosure may pre-define a maximum number of feature points for each of fingerprint images. Subsequently, based on each of the feature points and the grayscale value difference in the related area or other intensity calculation methods (e.g., directional intensity), the intensity of each of the feature points can be calculated. Furthermore, the feature points are sorted according to their intensity, and the feature point with the stronger intensity will be selected to be feature points preferentially.

In some embodiments, for the high-quality area of the fingerprint image, the minimum value in a small area or a large area can be selected as candidate feature points, and the present disclosure defines the above-mentioned minimum with a relatively loose standard to increase the number of effective feature points in the high-quality area of the fingerprint image. In some embodiments, for the low-quality area of the fingerprint image, the minimum value in a small area or a large area can be selected as candidate feature points, and the present disclosure defines the above-mentioned minimum with a relatively strict standard to reduce the number of effective feature points in the low-quality area of the fingerprint image.

For example, for the high-quality area of the fingerprint image, the definition of the minimum value in a small area or a large area is given by the subsequent formula 2, for the low-quality area of the fingerprint image, the definition of the minimum value within a small area or a large area is given by the subsequent formula 3:

$$I(x, y) \leq I(x-2:x+2, y-2:y+2) \quad \text{formula 2}$$

$$I(x, y) < I(x-2:x+2, y-2:y+2) \quad \text{formula 3}$$

As shown in formula 2, the definition of the minimum value of the high-quality area is relatively loose (simultaneously include conditions of less than and equal to). As shown in formula 3, the definition of the minimum value of the low-quality area is relatively strict (only include a condition of less than). Therefore, the present disclosure can reduce the number of ineffective feature points in the low-quality area of the fingerprint image.

In some embodiments, the plurality of first feature samples include a first feature confidence value of the plurality of high-quality areas, and the plurality of second feature samples include a second feature confidence value of the plurality of low-quality areas, wherein the first feature confidence value is larger than the second feature confidence value. For example, reference is made to FIG. 6, the feature confidence value of the feature point sampled from the high-quality areas A4 and A7~A16 is larger than the feature confidence value of the feature point sampled from the low-quality areas A1~A3 and A5~A6. In some embodiments, the feature confidence value of the feature point represents the degree of reliability of the feature point.

In some embodiments, the present disclosure can reduce the number of the second feature sample of the plurality of low-quality areas. For example, if the recognition rate of the fingerprint recognition is still low, the present disclosure can further reduce sampling to the low-quality areas A1~A3 and A5~A6, thereby avoiding blurry fingerprint feature sample to affect the recognition rate.

In step 250, outputting the plurality of first feature samples and the plurality of second feature samples. For example, after the fingerprint recognition device 100 of the present disclosure obtains the first feature samples and the second feature samples, the fingerprint recognition device 100 can output the first feature samples and the second feature samples for subsequent fingerprint recognition. In some embodiments, the first feature samples and the second feature samples outputted by the present disclosure include the coordinates of the feature samples (e.g., feature points) in the fingerprint image, such as the Cartesian coordinates of x and y coordinates.

It is noted that the present disclosure is not limited to the embodiments as shown in FIG. 1 to FIG. 6, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

In view of the above, the fingerprint recognition device 100 and the fingerprint recognition method 200 of the present disclosure can classify the same fingerprint image into different quality areas and adaptively sample different quality areas for facilitating subsequent fingerprint recognition. Therefore, the present disclosure effectively improves the problem that the recognition rate of the fingerprint recognition will be affected, and even fingerprint recognition failures will occur caused by solely utilizing a single fingerprint recognition mode.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A fingerprint recognition device, comprising:
   a memory, configured to store at least one command; and
   a processor, configured to read the at least one command to execute following steps:
   dividing a fingerprint image into a plurality of sub-areas;
   classifying the plurality of sub-areas into a plurality of high-quality areas and a plurality of low-quality areas according to a grayscale value ratio of the plurality of sub-areas;
   obtaining a plurality of first feature samples of the plurality of high-quality areas;
   obtaining a plurality of second feature samples of the plurality of low-quality areas, wherein a number of the plurality of first feature samples is larger than a number of the plurality of second feature samples; and
   outputting the plurality of first feature samples and the plurality of second feature samples.

2. The fingerprint recognition device of claim 1, wherein the processor is further configured to read the at least one command to execute following step:
   reducing the number of the plurality of second feature samples of the plurality of low-quality areas.

3. The fingerprint recognition device of claim 1, wherein the processor is further configured to read the at least one command to execute following steps:
   for a sub-area of the plurality of sub-areas, obtaining a plurality of grayscale values of a plurality of pixels of the sub-area;
   determining whether one of the plurality of grayscale values is larger than a grayscale threshold;
   if the one of the plurality of grayscale values is larger than the grayscale threshold, determining that the one of the plurality of grayscale values is a high grayscale value; and
   if the one of the plurality of grayscale values is not larger than the grayscale threshold, determining that the one of the plurality of grayscale values is a low grayscale value, wherein the grayscale value ratio comprises a ratio of a number of the high grayscale value of the plurality of sub-areas to a number of the low grayscale value of the plurality of sub-areas.

4. The fingerprint recognition device of claim 3, wherein the grayscale threshold ranges from 107 grayscales to 147 grayscales.

5. The fingerprint recognition device of claim 3, wherein the processor is further configured to read the at least one command to execute following steps:
   determining whether the grayscale value ratio of the high grayscale value to the low grayscale value of one of the plurality of sub-areas is within a grayscale value ratio range;
   if the grayscale value ratio of the one of the plurality of sub-areas is within the grayscale value ratio range, determining that the one of the plurality of sub-areas is the high-quality area; and
   if the grayscale value ratio of the one of the plurality of sub-areas is not within the grayscale value ratio range, determining that the one of the plurality of sub-areas is the low-quality area.

6. The fingerprint recognition device of claim 5, wherein the grayscale value ratio range comprises 0.6 to 1.4.

7. The fingerprint recognition device of claim 1, wherein the plurality of first feature samples comprise a plurality of first feature points, and the plurality of second feature samples comprise a plurality of second feature points, wherein a number of the plurality of first feature points is larger than a number of the plurality of second feature points.

8. The fingerprint recognition device of claim 1, wherein the plurality of first feature samples comprise a first feature confidence value of the plurality of high-quality areas, and the plurality of second feature samples comprise a second feature confidence value of the plurality of low-quality areas, wherein the first feature confidence value is larger than the second feature confidence value.

9. A fingerprint recognition method, which is executed by a processor reading at least one command, comprising:
   dividing a fingerprint image into a plurality of sub-areas;
   classifying the plurality of sub-areas into a plurality of high-quality areas and a plurality of low-quality areas according to a grayscale value ratio of the plurality of sub-areas;
   obtaining a plurality of first feature samples of the plurality of high-quality areas;
   obtaining a plurality of second feature samples of the plurality of low-quality areas, wherein a number of the plurality of first feature samples is larger than a number of the plurality of second feature samples; and
   outputting the plurality of first feature samples and the plurality of second feature samples.

10. The fingerprint recognition method of claim 9, further comprising:
    reducing the number of the plurality of second feature samples of the plurality of low-quality areas.

11. The fingerprint recognition method of claim 9, further comprising:
    for a sub-area of the plurality of sub-areas, obtaining a plurality of grayscale values of a plurality of pixels of the sub-area;
    determining whether one of the plurality of grayscale values is larger than a grayscale threshold;
    if the one of the plurality of grayscale values is larger than the grayscale threshold, determining that the one of the plurality of grayscale values is a high grayscale value; and
    if the one of the plurality of grayscale values is not larger than the grayscale threshold, determining that the one of the plurality of grayscale values is a low grayscale value, wherein the grayscale value ratio comprises a ratio of a number of the high grayscale value of the plurality of sub-areas to a number of the low grayscale value of the plurality of sub-areas.

12. The fingerprint recognition method of claim 11, wherein the grayscale threshold ranges from 107 grayscales to 147 grayscales.

13. The fingerprint recognition method of claim 11, further comprising:
- determining whether the grayscale value ratio of the high grayscale value to the low grayscale value of one of the plurality of sub-areas is within a grayscale value ratio range;
- if the grayscale value ratio of the one of the plurality of sub-areas is within the grayscale value ratio range, determining that the one of the plurality of sub-areas is the high-quality area; and
- if the grayscale value ratio of the one of the plurality of sub-areas is not within the grayscale value ratio range, determining that the one of the plurality of sub-areas is the low-quality area.

14. The fingerprint recognition method of claim 13, wherein the grayscale value ratio range comprises 0.6 to 1.4.

15. The fingerprint recognition method of claim 9, wherein the plurality of first feature samples comprise a plurality of first feature points, and the plurality of second feature samples comprise a plurality of second feature points, wherein a number of the plurality of first feature points is larger than a number of the plurality of second feature points.

16. The fingerprint recognition method of claim 9, wherein the plurality of first feature samples comprise a first feature confidence value of the plurality of high-quality areas, and the plurality of second feature samples comprise a second feature confidence value of the plurality of low-quality areas, wherein the first feature confidence value is larger than the second feature confidence value.

\* \* \* \* \*